3,231,487
DEMULSIFICATION
Henry D. Nettles, Longview, Tex., assignor to Pan American Petroleum Corporation, Tulsa, Okla., a corporation of Delaware
No Drawing. Filed Dec. 23, 1963, Ser. No. 332,959
4 Claims. (Cl. 208—188)

This invention relates to the treatment of emulsions, and particularly it relates to the dehydration of crude oils containing emulsified water.

Oftentimes crude oil is produced from wells along with water which forms an emulsion of water droplets in the crude oil. Since water is noncombustible and reduces the calorific value of the oil in direct relation to the amount of water present in the emulsion, purchasers generally refuse to accept emulsified oil containing more than 2 percent water and in some instances will not accept oil containing more than one-half percent water. Therefore, it is the general practice to treat such water-in-oil emulsions to reduced the amount of water to an acceptable maximum. There are a number of well-known demulsification techniques, including the use of thermal treatment, chemical agents, filtration, electrical dehydration, centrifuging, etc., which are known for use in breaking emulsions. In certain instances it has been found advantageous to combine various of the above treatments, e.g., to use a combination of thermal treatment with a chemical demulsification agent, electrical dehydration using a chemical agent, etc.

For example, it is the general practice in the field to treat crude oil containing objectionable amounts of emulsified water with a chemical demulsifier and to inject a gas, such as natural gas or the like, into the tank containing the oil to "roll" the oil and achieve better contact between the oil and the demulsifier. Also, another technique frequently used is to supplement the chemical treatment with heating, wherein the treated oil is circulated through a heater to aid in breaking the emulsion, so that the oil is dehydrated to an acceptable level. However, in the field such treatments used to supplement the chemical treatment are oftentimes relatively uneconomical or, in many cases not feasible due to lack of suitable facilities. For example, in many remote locations facilities for gas rolling may not be available, and to provide an oil-heating unit is very expensive. Even in instances where an existing heater is available, such heating may result in product loss as a result of evaporation and/or overloading the heater by circulating the tank contents while producing wells through the heater.

Therefore, an object of the present invention is a method of treating emulsions, such as emulsified water in crude oil, which method is efficient and easily performed, while at the same time being economical and well adapted for field use in remote locations where permanent facilities for the treatment of such emulsions are not available.

In accordance with the present invention there is provided a method of treating emulsions wherein an emulsion is treated in an emulsion-breaking zone to break the emulsion, the treatment comprising introducing solid carbon dioxide into the emulsion in said zone to aid in breaking the emulsion. Such treatment is especially well adapted for the demulsification of crude oil-water emulsions in remote locations. In a preferred form, the method comprises distributing throughout the emulsion-breaking zone solid particles of solid carbon dioxide, and typically, about 0.04 pound to about 0.1 pound of solid carbon dioxide may be employed per barrel of hydrocarbon oil treated.

In the practice of the invention, crude oil is introduced into a tank, typically a stock tank, and a chemical demulsifier added to the oil to aid in separating the water from the crude oil. The demulsification agent may be added to the produced oil in the well or subsequently, as in the stock tank used in effecting the treatment. The type and quantity of chemical demulsifier will vary according to the characteristics of the emulsion being treated. Commonly used demulsifiers may comprise petroleum sulfonates, such as the sodium, calcium or ammonia salts thereof and/or organic acids esters of ethylene oxide adducts of polypropylene glycols. Many types of demulsifying agents are well known in the art for such use and are described in considerable detail in the book "Emulsions and Foams," by Berkman and Egloff, published by Reinhold Publishing Corp., New York (1941), pages 219 to 386. Since such chemical demulsification agents are well known in the art and form no part of the invention, it is not necessary to describe these agents in detail herein.

In general, crude oils of various types and having a wide range of gravities have been found susceptible to treatment by the method of the invention. However, many hydrocarbon oils may be treated by the method. Normally, the solid carbon dioxide is introduced into the oil containing the chemical demulsifier at atmospheric temperatures and pressures. However, if desired, the oil may be heated to enhance the separation, or additional agitation, by gas or mechanical means, may be employed as a supplemental treatment.

The solid carbon dioxide may be introduced into the oil by various means. It is generally preferred to employ relatively small particles of solid carbon dioxide and to evenly distribute such particles across the vessel containing the oil to be treated. Typically, large blocks of Dry Ice may be crushed into particles ranging from perhaps 1 inch to 12 inches in diameter and these particles then introduced into the oil in the tank. As mentioned above, varying amounts of solid carbon dioxide have been found effective. Normally about 20 to about 50 pounds of solid carbon dioxide per 500-barrel tank may be employed. However, greater or lesser quantities, e.g., 0.02 to 0.2 pound per barrel of oil, may be employed to satisfactorily treat the emulsion.

It has been determined that treatment according to the present invention has effectively broken emulsions of water in crude oil containing from about 2 percent to about 14 percent bottom settlings and water (BS and W), with shakeouts ranging from 0.2 percent to 1 percent BS and W. For example, 450 barrels of 38° API crude oil containing approximately 3 percent BS and W in the form of an emulsion was treated at ambient conditions of pressure and temperature with about 3 gallons of demulsifier in a 500-barrel stock tank. This oil had a stock tank viscosity of 14.5 centipoises at 60° F. and is an intermediate base crude which forms a relatively loose emulsion with water. The solid carbon dioxide was broken into pieces ranging from about 6 inches to about 10 inches in diameter and about 50 pounds of this was distributed in the tank through the tank hatch. Carbon dioxide gas was released over a period of more than three hours and provided continuous agitation during this time to effectively aid in breaking the water-in-oil emulsion. After this treatment, the BS and W content of the oil had been reduced to 0.2 percent, with 12 inches of free water being knocked out. Hard paraffin on the tank bottom was broken up in the free water layer and removed when the free water was drained off.

In another instance, 396 barrels of a 23° API gravity asphalt base crude oil was treated in a manner similar to that above, using about two gallons of demulsifier and about 30 pounds of solid carbon dioxide broken into small pieces. This oil was rather heavy and viscous and formed a relatively tight stable emulsion with water. Before treatment the oil contained 8 percent BS and W at the top of the tank and 14 percent BS and W at the bottom of the tank with no free water present at the bottom of the tank.

As a result of the treatment, the BS and W content of the oil was reduced to 0.5 percent.

From the foregoing it is seen that the present invention provides an efficient and economical method for the treatment of emulsions and which is well suited for the field dehydration of produced crude oils. Heretofore, it was necessary to employ a hot oil unit to heat the emulsion in order to satisfactorily dehydrate the oil. The present method has been found to be very effective in breaking the emulsion and to result in a significant reduction in operating expense.

I claim:

1. In the demulsification art wherein an emulsion of water in oil is contacted with a demulsification agent in an emulsion-breaking zone, the method comprising distributing particles of solid carbon dioxide in the emulsion in said zone to aid in breaking said emulsion.

2. The method of claim 1 wherein said oil is crude oil.

3. The method of claim 1 wherein about 0.02 to 0.2 pound of solid carbon dioxide is employed per barrel of hydrocarbon liquid treated.

4. The method of claim 1 wherein said treatment is carried out at ambient conditions of pressure and temperature.

References Cited by the Examiner
UNITED STATES PATENTS
1,802,090  4/1931  Roberts _____ 252—328

FOREIGN PATENTS
484,522  5/1938  Great Britain.

DELBERT E. GANTZ, *Primary Examiner.*

ALPHONSO D. SULLIVAN, *Examiner.*